US005201178A

United States Patent [19]

Rosemann

[11] Patent Number: 5,201,178

[45] Date of Patent: Apr. 13, 1993

[54] HYDRA-JACK SCREW

[76] Inventor: Richard Rosemann, 456 S. Clay, Kirkwood, Mo. 63122

[21] Appl. No.: 687,339

[22] Filed: Apr. 18, 1991

[51] Int. Cl.[5] .............................................. B60T 17/22

[52] U.S. Cl. .............................................. 60/534; 60/568; 60/594; 269/32; 92/107

[58] Field of Search .............................................. 60/533, 534, 568, 594; 269/32; 92/75, 107

[56] References Cited

U.S. PATENT DOCUMENTS

| | | | |
|---|---|---|---|
| 814,508 | 3/1906 | Barry | 60/594 |
| 2,492,338 | 12/1949 | Vickers | 269/32 |
| 2,509,991 | 5/1950 | Schenke | 269/32 |
| 3,129,584 | 4/1964 | Canning et al. . | |
| 3,276,306 | 10/1966 | Winkler et al. . | |
| 3,377,847 | 4/1968 | Aske | 60/534 X |
| 3,603,579 | 9/1971 | Odom | 269/32 X |
| 3,815,365 | 6/1974 | House | 60/568 X |
| 4,507,996 | 4/1985 | Kesten . | |
| 4,605,208 | 8/1986 | Durham | 269/32 |
| 4,759,247 | 7/1988 | Bell et al. . | |
| 4,773,636 | 9/1988 | Takahashi | 269/32 |

FOREIGN PATENT DOCUMENTS

| | | | |
|---|---|---|---|
| 878392 | 1/1943 | France | 60/534 |
| 497227 | 12/1938 | United Kingdom | 60/534 |

*Primary Examiner*—Edward K. Look

*Assistant Examiner*—Todd Mattingly

*Attorney, Agent, or Firm*—Rogers, Howell & Haferkamp

[57] ABSTRACT

A hydra-jack screw apparatus is provided for exerting a force against an object, for adjusting the magnitude of the force exerted against the object, and for providing a visual indication of the magnitude of the force exerted against the object. The apparatus is comprised of a base member housing a piston chamber, a jack screw extending from the bottom of the base member, a fluid pressure gauge mounted on the base member, and a pair of pistons received in the piston chamber for reciprocating movement. One of the pistons has a piston rod that extends through a center bore of the jack screw and engages against an object against which a force is to be applied. The second piston has a piston rod that extends from the piston chamber of the base member and is attached to a manual forced adjusting knob. A volume of fluid is contained in the piston chamber between the first and second pistons, and as the manual knob is turned, the pressure of the volume of fluid is adjustably increased or decreased. The increasing or decreasing fluid pressure exerts a force on the first piston that is transmitted through the first piston rod and is applied against the object engaged by the piston rod. The pressure gauge is in fluid communication with the volume of fluid and provides a visual indication of the magnitude of force exerted on the object by the first piston rod.

14 Claims, 1 Drawing Sheet

HYDRA-JACK SCREW

BACKGROUND OF THE INVENTION (1) Field of the Invention

The present invention pertains to a hydra-jack screw apparatus used to exert a force against an object, to vary the magnitude of the force exerted against the object, and to provide a visual indication of the magnitude of the force applied against the object. The hydra-jack screw apparatus of the invention may be used in a variety of environments where it is desired to adjust a force exerted on an object, and be provided with a visual indication of the magnitude of force exerted on the object.

(2) Description of the Related Art

In many applications where a screw is used to exert a force against an object by turning the screw through a complementary threaded hole in a stationary member adjacent the object, it is desirable to be able to adjust the force exerted on the object and to be provided with some indication of the force exerted on the object. Just one example of such an environment is in the jack screws of a rotary die cutting press.

Most conventional die cutting presses include as part of the press two or more jack screws. The jack screws adjust the pressure or force exerted by the rotating cutting die of the press against a web of stock material passed between the rotating cutting die and the anvil roll of the press. The jack screws of the press are tightened down by the press operator to force the cutting die toward the anvil roll and increase the cutting force of the rotating die against the web of stock material, causing the cutting edges of the die to cut deeper through the stock material. The jack screws of the press are backed out of their complementary screw threaded holes to reduce the force exerted by the rotating cutting die on the web of stock material and decrease the depth of the cuts in the stock material produced by the cutting edges of the die.

Such an adjustment of the jack screws is necessary in order for the press to be used in a variety of cutting operations. In some cutting operations it may be desired to cut completely through the material, while in other operations it may be desired to only cut through a first layer of a multi-layered material. The cuts made through the material by the cutting die are monitored by the press operator to ensure that a uniform pressure is exerted across the rotating cutting die during the operation of the press. It is necessary that a uniform pressure be exerted across the rotating cutting die in order for the press to produce consistent cuts of the desired depth through the web material passed through the press.

To assist the operator, some prior art presses are provided with gauge assemblies that provide the operator with a visual indication of the magnitude of force exerted by the cutting die across the width of the stock material being cut. However, in many applications of jack screws a pressure monitoring gauge is not provided with the machine in which the jack screws are used. In such situations a separate pressure gauge must be used to provide the operator of the jack screws with some visual indication of the force being exerted by the jack screws as they are adjusted.

What is needed is a single apparatus that can be used to exert a force against an object, and can be used to adjust the force exerted against the object, and also simultaneously provides a visual indication of the force exerted against the object as that force is adjusted.

SUMMARY OF THE INVENTION

The hydraulic jack screw of the present invention is generally comprised of a base member having a jack screw extending from its bottom, a force adjusting knob extending from its top, and a fluid pressure gauge mounted at the middle of the base member.

The base member is generally a cylindrical member having a cylindrical piston chamber in its interior. A pair of pistons are mounted in the piston chamber for reciprocating movement. One of the pistons is positioned toward the bottom of the chamber, the second of the pistons is positioned toward the top of the chamber, and a fluid volume is contained inside the piston chamber between the first and second pistons. The fluid pressure gauge mounted on the base member is in fluid communication with the volume of fluid contained in the piston chamber.

The jack screw mounted on the base member extends downward from the base member. The jack screw has a screw threaded exterior surface that is screwed through a complementary threaded hole provided in any stationary member adjacent the object against which a force is to be applied. Screwing the jack screw into the stationary member provides support for the hydra-jack screw apparatus. By screwing the jack screw into and out of the hole in the stationary member, the base member is adjustably positioned relative to the stationary member. The jack screw has a hollow interior bore through its entire length. The hollow interior bore communicates with the piston chamber of the base member, and a piston rod engaging with the first piston extends through the hollow bore and projects from the distal end of the jack screw. The end of the piston rod projecting from the jack screw is engaged against the object to apply a force against the object in a manner to be explained.

A second piston rod having a screw threaded exterior engages the second piston and extends through a complementary screw threaded hole at the top of the base member. The second piston rod extends upward from the base member and the force adjusting knob is fixed to the distal end of the second rod. Turning the knob in opposite directions screws the second piston rod into and out of the piston chamber. The movement of the second piston rod into and out of the piston chamber causes the second piston to reciprocate further into or back out of the piston chamber. The reciprocation of the second piston increases and decreases the pressure of the volume of fluid contained in the piston chamber between the first and second pistons. The fluctuations in fluid pressure are monitored by viewing the pressure gauge.

The increasing pressure of the fluid volume exerts a force on the first piston, and the force is transmitted through the first piston rod and is exerted against the object engaged by the first piston rod. By turning the adjustment knob so that the second piston rod forces the second piston to compress and increase the pressure of the fluid contained in the piston chamber, the increasing fluid pressure exerts an increasing force on the first piston. The increase in force on the first piston is transmitted through the first piston rod and is exerted on the object engaged by the first piston rod. The magnitude of the force increase can be monitored by viewing the pressure gauge which is calibrated to provide a visual reading of the force exerted on the object. Rotating the manual knob so that the second piston rod is backed out of the piston chamber causes the second piston to decrease the pressure of the fluid contained in the piston chamber. The decreased fluid pressure exerts a lesser force on the first piston, and the reduced force is transmitted through the first piston rod to the object engaged by the rod. Again, the reduction in the magnitude of the force exerted by the first piston rod on the object is monitored by viewing the pressure gauge.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
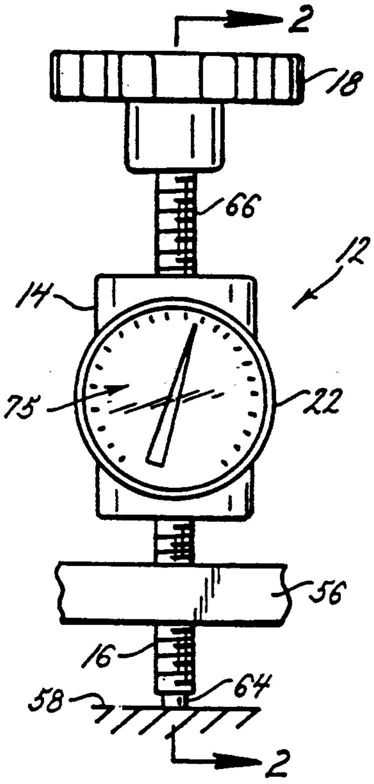
FIG. 1 is a front elevation view of the hydra-jack screw of the present invention.

The hydra-jack screw apparatus 12 of the present invention is shown in FIG. 1 of the drawing figures. The apparatus is generally comprised of a base member 14 having a jack screw 16 extending from its bottom, a force adjusting knob 18 provided at the top of the base member, and a fluid pressure gauge 22 mounted to the base member between the jack screw and knob.

The base member 14 is cylindrical and has a cylindrical piston chamber 24 extending axially through its interior. A bottom end cap 26 and a top end cap 28 are secured at opposite ends of the piston chamber by being screw threaded into the opposite ends of the chamber. The bottom and top end caps 26, 28 define the bottom and top limits of the piston chamber 24. Screw threaded holes 32, 34 are provided through the centers of the bottom and top end caps 26, 28, respectively.

A pair of pistons 36, 38 are mounted in the piston chamber 24 for reciprocating movement in the chamber. One of the pistons 36 is positioned toward the bottom of the chamber 24, the second of the pistons 38 is positioned toward the top of the chamber, and a volume of fluid 42 is contained inside the piston chamber 24 between the first and second pistons. The fluid 42 is prevented from leaking past the first and second pistons 36, 38 by O-ring seals 44, 46 provided around the circumferential surfaces of the respective pistons. The fluid pressure gauge 22 is mounted in a screw threaded hole 48 through the side wall of the base member 14 and communicates with the volume of fluid 42 contained in the piston chamber 24. The reading of the pressure gauge is indicative of the pressure of the volume of fluid 42.

The jack screw 16 has a screw threaded exterior that is secured in the screw threaded hole 32 at the center of the base member bottom end cap 26. The screw threaded exterior of the jack screw shown is only one example of a method of holding the hydra-jack screw apparatus stationary relative to the object on which a force is to be exerted. The exterior surface of the jack screw below the base member may be provided with other means of holding the jack screw in an adjusted position relative to the stationary member because the actual force adjustments are made by the force adjusting knob at the top of the base member. The jack screw extends downward from the base member to its distal end 50. The jack screw 16 is provided with a hollow interior bore 52 that extends axially through its entire length. The hollow interior bore 52 communicates with the piston chamber 24 of the base member.

Figure 2:
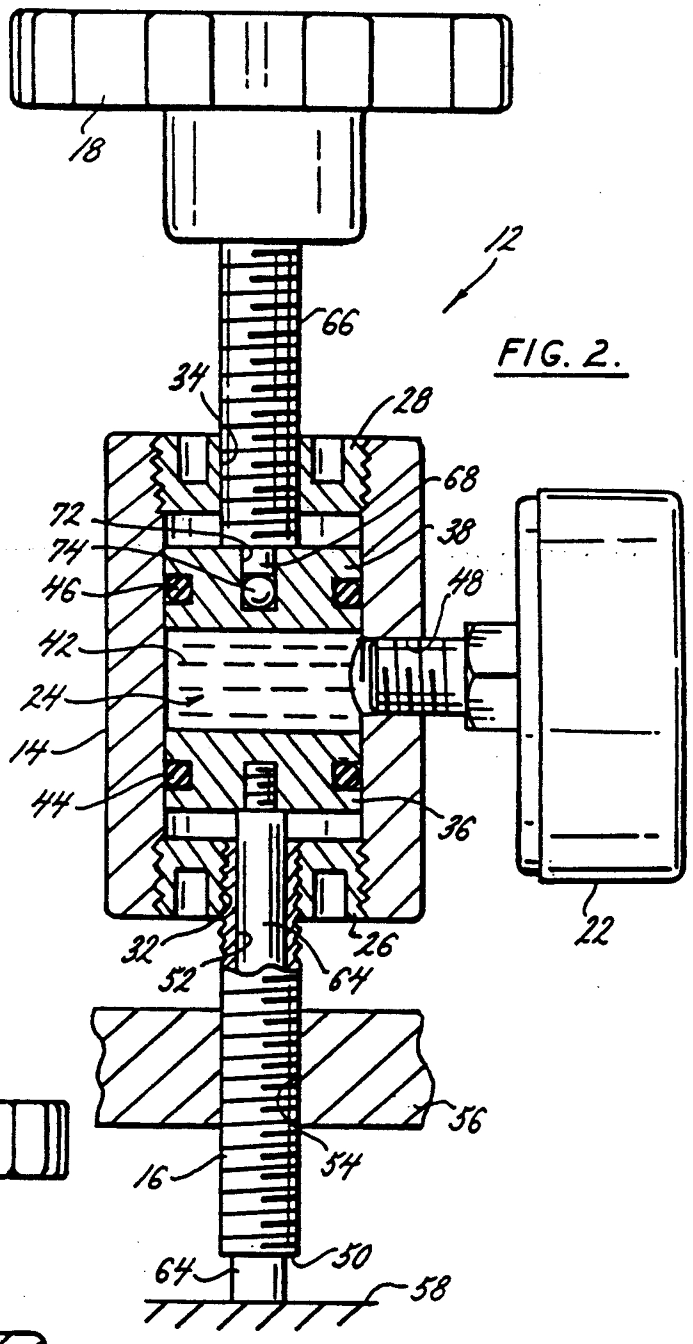
FIG. 2 is a side elevation view, in section, of the hydra-jack screw of the invention.

As shown in FIGS. 1 and 2, the screw threaded exterior surface of the jack screw 16 is screwed through a complementary threaded hole 54 provided in a stationary member 56 adjacent the object 58 against which a force is to be applied by the apparatus. The stationary member 56 and object 58 are not component parts of the invention, but illustrate one environment in which the apparatus of the invention may be used. In other environments it may be necessary to tap a screw threaded hole in a stationary member adjacent the object on which the adjustable force is to be exerted. As can be seen in drawing FIGS. 1 and 2, by screwing the jack screw 16 into and out of the hole 54 in the stationary member 56, the base member 14 and the distal end 52 of the jack screw are adjustably positioned relative to the stationary member 56 and the object 58. In the illustrative example shown in FIGS. 1 and 2, the stationary member 56 is positioned relatively close to the object 58 against which a force is to be applied. It should be understood that the length of the jack screw 16 may be increased so that the apparatus of the invention may be used to apply an adjustable force against an object that is spaced at a greater distance from a stationary member than the spacing between the object 58 and stationary member 56 shown in FIGS. 1 and 2.

A first piston rod 64 is slidably received in the interior bore 52 of the jack screw 16. A first end of the piston rod 64 engages with the first piston 36 at the bottom of the piston chamber 24. The opposite end of the piston rod 64 projects from the distal end 50 of the jack screw and engages against the object 58 against which a force is to be applied.

A second piston rod 66 having a screw threaded exterior surface is screw threaded through the complementary threaded hole 38 at the center of the base member top end cap 28. The second piston rod 66 engages the second piston 38 at the top of the piston chamber 24. The lower end of the second piston rod 66, as viewed in FIG. 2, is provided with a cylindrical stub 68 that engages in a cylindrical cavity 72 at the center of the second piston 38. A single ball bearing 74 is provided at the bottom of the cavity 72. The ball bearing 74 provides a rotating engagement between the lower end of the second piston rod 66 and the second piston 38. The second piston rod 66 extends upward from the base member 14 to its distal end where the force adjusting knob 18 is fixed to the rod.

In use, the force adjusting knob 18 is turned in opposite directions to screw the second piston rod 66 into and out of its screw threaded engagement in the center hole 34 of the base member top end cap 28. Screwing the second piston rod 66 clockwise into the top end cap 28 causes the rod to move the second piston 38 downward into the piston chamber 24 as viewed in FIG. 2. The downward movement of the second piston 38 causes the fluid pressure of the volume of fluid 42 contained in the piston chamber 24 to increase. The increasing pressure of the fluid volume 42 exerts an increasing downward force on the first piston 36. The fluid pressure force exerted on the first piston is transmitted through the first piston rod 64 to the object 58 engaged by the rod. By continuing to turn the adjustment knob 18 clockwise, the second piston rod 66 is screwed still further in through the top end cap 28 and continues to push the second piston 38 downward in the piston chamber 24. The downward movement of the second piston 38 compresses the volume containing the fluid 42, causing the fluid pressure to continue to increase. The increasing fluid pressure exerts an increasing force on the first piston 36, and the increase in force is transmitted through the first piston rod 64 and is exerted on the object 58 engaged by the rod.

The increase in the fluid pressure is monitored by viewing the pressure scale 74 on the fluid pressure gauge 22. The scale 74 is calibrated so that a magnitude of force read from the scale is equal to the magnitude of force exerted by the first piston rod 64 against the object 58.

Rotating the manual knob 18 counterclockwise so that the second piston rod 66 is screwed out of the top end cap 28 lets the second piston 38 move upward in the piston chamber 24 as viewed in FIG. 2. The upward movement of the second piston 38 expands the volume of the piston chamber between the first and second pistons 36, 38, and permits the pressure of the fluid volume contained in the piston chamber 24 to decrease. The decreased fluid pressure exerts a lesser force on the first piston 36, and the reduced pressure force is transmitted through the first piston rod 64 to the object 58 engaged by the rod. The reduction in the magnitude of the force exerted by the first piston rod 64 on the object 58 is monitored by viewing the pressure gauge 22.

By selectively turning the force adjusting knob 18 clockwise and counterclockwise relative to the base member 14, the magnitude of force exerted by the first piston rod 64 on the object 58 is selectively increased and decreased. The magnitude of the change in the force exerted by the first piston rod 64 on the object 58 can be adjusted accurately by viewing the pressure gauge 22 as the adjustment knob 18 is turned.

Figure 3:
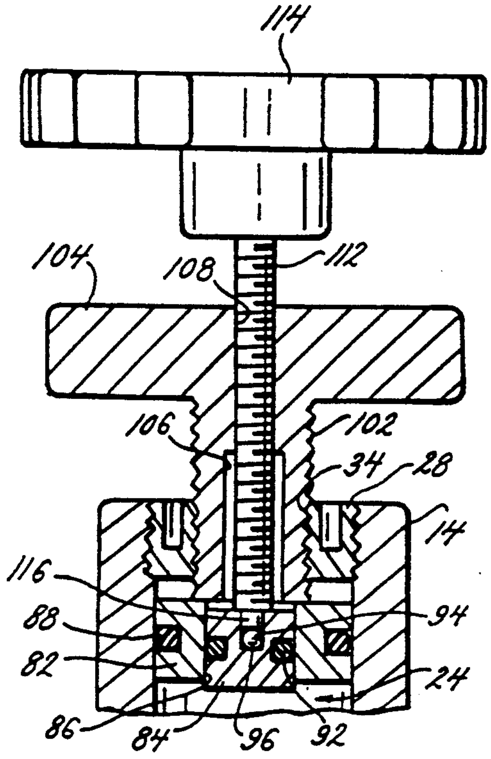
FIG. 3 is a segmented side elevation view, in section, of a variant embodiment of the hydra-jack screw of the invention.

FIG. 3 shows a variant embodiment of the hydra-jack screw apparatus of the present invention comprising a set of force adjustment knobs that provide a more accurate adjustment of the force exerted by the first piston rod 64 against the object 58. Many of the component parts of the embodiment of the invention shown in FIG. 3 are identical to component parts of the invention described earlier with reference to FIGS. 1 and 2, and their reference numbers are the same as the reference numbers used in FIGS. 1 and 2.

The embodiment of the invention shown in FIG. 3 is provided with a second piston comprised of an outer piston member 82 and an inner piston member 84. The outer piston member 82 is an annular piston with a cylindrical center bore 86. The outer piston member is received for reciprocating movement in the piston chamber 24 of the base member 14, and fluid is kept from leaking past the outer piston member by an O-ring seal 88 provided around the circumferential surface of the outer piston member.

The inner piston member 84 is a cylindrical member that is received for reciprocating movement in the center bore 86 of the outer piston member 82. Fluid is prevented from leaking between the inner piston member 84 and the center bore 86 of the outer piston member 82 by an O-ring seal 92 provided around the circumferential surface of the inner piston member 84. Like the second piston of the first embodiment of the invention, the inner piston member 84 is provided with a center cavity 94 and a single ball bearing 96 received in the cavity.

A coarse adjustment piston rod 102 is screw threaded through the complementary screw threaded hole 34 in the top end cap 28 of the base member. One end of the rod 82 engages against the top surfaces of both the outer piston member 82 and the inner piston member 84. A coarse adjustment knob 104 is provided on the opposite end of the coarse adjustment rod 102. An axial bore 106 extends through the center of the coarse adjustment rod 102, and a portion of the center bore is provided with a screw threaded interior surface 108.

A fine adjustment piston rod 112 is screw threaded through the screw threaded portion 108 of the coarse adjustment rod center bore. One end of the fine adjustment rod engages the inner piston member 84. This end of the fine adjustment rod 112 is provided with a cylindrical stub 116. The stub extends into the cylindrical cavity 94 of the inner piston member 84 and engages against the ball bearing 96, thereby providing a rotating engagement between the inner piston member 84 and the fine adjustment piston rod 112. The opposite end of the fine adjustment piston rod 112 extends from the course adjustment knob 104 and has a fine adjustment knob 114 fixed thereto.

Adjusting the magnitude of the force exerted by the first piston rod 64 against the object 58 is performed in substantially the same manner as the force adjustments made with the first embodiment of the invention. The coarse adjustment knob 104 is first rotated clockwise to screw the coarse adjustment piston rod 102 through the screw threaded hole 34 of the top end cap 28 and into the piston chamber 24. The downward movement of the coarse adjustment piston rod 102 into the piston chamber pushes the outer piston member 82 and the inner piston member 84 downward together into the piston chamber 24 (as viewed in FIG. 3). The downward movement of the outer and inner piston members 82, 84 increases the fluid pressure of the volume of fluid 42 contained in the piston chamber. As the coarse adjustment piston rod 102 is rotated clockwise and is screwed down into the piston chamber 24, the fine adjustment piston rod 112 rotates with the coarse adjustment piston rod 102 and travels with the coarse adjustment piston rod down into the piston chamber 24. When the force exerted by the first piston rod 64 approaches a desired magnitude due to the increasing fluid pressure of the volume of fluid 42 contained in the piston chamber 24, the fine adjustment knob 114 is then rotated clockwise to increase the pressure of the fluid volume 42 at a slower rate than that provided by rotating the coarse adjustment knob 104. By rotating the fine adjustment knob 114, the fine adjustment piston rod 112 is screwed through the center bore 108 of the coarse adjustment piston rod 102 and pushes the inner piston member 84 downward relative to the outer piston member 82. Because the downward movement of the inner piston member 84 displaces a smaller volume of fluid than the inner and outer piston members 82, 84 combined, the pressure of the fluid volume 42 contained in the piston chamber 24 increases at a slower rate. The slower rate of pressure increase enables a finer adjustment of the force exerted by the first piston rod 64 against the object 58.

The force exerted by the first piston rod 64 on the object is decreased by first rotating the fine adjustment piston rod 114 counterclockwise. This causes the fine adjustment piston rod 114 to back out of the center bore 108 of the coarse adjustment piston rod 102, and causes the inner piston member 84 to move upward as viewed in FIG. 3 through the center bore of the outer piston member 82 until it seats against the bottom edge of the coarse adjustment piston rod 102. The coarse adjustment piston rod 102 is then rotated counterclockwise to cause the coarse adjustment piston rod to back out of the piston chamber 24, and cause both the inner piston member 84 and the outer piston member 82 to move upward together as viewed in FIG. 3. The upward movement of the inner piston member 84 and the outer piston member 82 in the piston chamber 24 reduces the pressure of the fluid volume 42 contained in the piston chamber, and thereby reduces the force exerted by the first piston rod 64 against the object 58.

Although the hydra-jack screw of the present invention has been described as being useful in the environment of a die cutting press, it should be understood that the hydra-jack screw can be used in any application where it is desired to exert a force on a body, to be able to adjust the magnitude of the force exerted on the body, and to be provided with some visual indication of the magnitude of force being exerted on the body.

While the present invention has been described by reference to specific embodiments, it should be understood that modifications and variations of the invention may be constructed without departing from the scope of the invention defined in the following claims.

I claim:

1. An apparatus for applying a force to an object and for varying a magnitude of the force applied while providing a visual indication of the magnitude of the force applied, the apparatus comprising:
- a base member;
- means for supporting the base member in a fixed position relative to an object, and for adjusting the position of the base member relative to the object by selectively moving the base member toward or away from the object;
- means supported on the base member for applying a force to the object;
- means supported on the base member for selectively increasing or decreasing the force applied to the object;
- means supported on the base member for providing a visual indication of a magnitude of the force applied to the object;
- the means for supporting the base member includes a screw threaded column to be screwed into a complementary screw threaded hole in a stationary member adjacent the object to support the base member relative to the object, the screw threaded column adjusting the position of the base member relative to the object by selectively screwing the column into and out of the screw threaded hole;
- the screw threaded column is provided with a hollow center bore extending axially through the column;
- the base member houses a piston chamber; and
- the means for applying a force to the object includes a first piston mounted for reciprocating movement in the chamber and a first piston rod engaged with the first piston and extending from the piston chamber through the hollow bore of the screw threaded column, the first piston rod extending from the hollow bore and being engagable with the object to apply a force to the object.

2. The apparatus of claim 1, wherein:
- the means for selectively increasing or decreasing the force applied to the object includes a second piston mounted for reciprocating movement in the piston chamber, a volume of fluid enclosed in the piston chamber between the first and second pistons, and a second piston rod engaged with the second piston and extending from the piston chamber, the second piston rod being adjustably positioned into and out of the piston chamber to move the second piston in the piston chamber and thereby adjust a measure of fluid pressure of the volume of fluid, the fluid pressure applying a force to the first piston and the first piston rod communicating the force to the object engaged by the first piston rod.

3. The apparatus of claim 2, wherein:
- the second piston includes an annular outer piston member having a center bore and an inner piston member mounted in the center bore of the outer piston member, the outer piston member is mounted for reciprocating movement in the piston chamber and the inner piston member is mounted for reciprocating movement in the center bore of the outer piston member.

4. The apparatus of claim 3, wherein:
- the second piston rod engages the outer piston member and the inner piston member, the second piston rod has a center bore extending axially through the second piston rod, and a third piston rod extends through the center bore of the second piston rod and engages the inner piston member.

5. The apparatus of claim 2, wherein:
- the means for providing a visual indication of the magnitude of the force applied to the object includes a fluid pressure gauge in fluid communication with the volume of fluid in the piston chamber, the fluid pressure gauge providing a visual indication of the measure of fluid pressure of the volume of fluid.

6. The apparatus of claim 2, wherein:
- the second piston rod has an exterior surface formed as a series of screw threads, the screw threads of the second piston rod extend through a complementary screw threaded hole in the base member as the second piston rod extends from the piston chamber, the second piston rod being adjustably positioned into and out of the piston chamber by turning the second piston rod in opposite directions relative to the screw threaded hole.

7. An apparatus for applying a force to an object and for adjusting a magnitude of the force applied to the object while providing a visual indication of the magnitude of the force applied, the apparatus comprising:
- a base member;
- a screw threaded column secured to the base member, the column being selectively screwed into and out of a complementary screw threaded hole in a stationary member adjacent the object to support the base member in a set position relative to the object and to adjustably position the base member closer to or further away from the object, respectively, than when in the set position;
- means supported on the base member for applying a force to the object;
- means supported on the base member for selectively increasing or decreasing the magnitude of the force applied to the object; and means supported on the base member for providing a visual indication of the magnitude of the force applied to the object;

the screw threaded column is provided with a hollow center bore extending axially through the column, the base member houses a piston chamber;

and the means for applying a force to the object includes a first piston mounted for reciprocating movement in the piston chamber, and a first piston rod engaged with the first piston and extending from the piston chamber, through the hollow center bore of the column, and extending from the center bore and being engagable with the object to apply a force to the object.

8. The apparatus of claim 7, wherein:

the means for selectively increasing or decreasing the magnitude of the force applied to the object includes a second piston mounted for reciprocating movement in the piston chamber, a volume of fluid enclosed inside the piston chamber between the first and second pistons, and a second piston rod engaged with the second piston and extending from the piston chamber, the second piston rod being adjustably positioned into and out of the piston chamber to move the second piston in the piston chamber and thereby adjust a measure of fluid pressure of the volume of fluid, the fluid pressure applying a force to the first piston and the first piston rod communicating the force applied to the object engaged by the first piston rod.

9. The apparatus of claim 8, wherein:

the second piston includes an annular outer piston member having a center bore and an inner piston member mounted in the center bore of the outer piston member, the outer piston member is mounted for reciprocating movement in the piston chamber and the inner piston member is mounted for reciprocating movement in the center bore of the outer piston member.

10. The apparatus of claim 9, wherein:

the second piston rod engages the outer piston member and the inner piston member, the second piston rod has a center bore extending axially through the second piston rod, and a third piston rod extends through the center bore of the second piston rod and engages the inner piston member.

11. The apparatus of claim 8, wherein:

the second piston rod has an exterior surface formed as a series of screw threads, the screw threads of the second piston rod extend through a complementary screw threaded hole in the base member as the second piston rod extends from the piston chamber, and the second piston rod is adjustably positioned into and out of the piston chamber by turning the second piston rod in opposite directions relative to the screw threaded hole in the base member.

12. The apparatus of claim 11, wherein:

the means for providing a visual indication of the magnitude of the force applied to the object includes a fluid pressure gauge in fluid communication with the volume of fluid in the piston chamber, the fluid pressure gauge providing a visual indication of the measure of fluid pressure of the volume of fluid.

13. An apparatus for applying a force to an object and for adjusting the magnitude of the force applied while providing a visual indication of the magnitude of the force applied, the apparatus comprising:

a body member housing a piston chamber;

an adjustable support member on the body member for supporting the body member in a desired position relative to an object, and for supporting the body member while adjusting the position of the body member relative to the object by selectively moving the body member toward or away from the object;

a first piston mounted in the piston chamber for reciprocating movement in the piston chamber;

a second piston mounted in the piston chamber for reciprocating movement in the piston chamber;

the first piston and the second piston enclosing a volume of fluid in the piston chamber between the first piston and the second piston;

a first piston rod engaging the first piston and extending from the piston chamber, a length of the first piston rod extending from the piston chamber being engagable with the object;

a second piston rod engaging the second piston and extending from the piston chamber, a length of the second piston rod extending from the piston chamber being adjustable into and out of the piston chamber to move the second piston in the piston chamber and thereby adjust a measure of fluid pressure of the volume of fluid;

a fluid pressure gauge supported on the body member and communicating with the volume of fluid in the piston chamber, the fluid pressure gauge providing a visual indication of the measure of fluid pressure of the volume of fluid; and the second piston includes an annular outer piston member having a center bore and an inner piston member mounted in the center bore of the outer piston member, the outer piston member is mounted for reciprocating movement in the piston chamber and the inner piston member is mounted for reciprocating movement in the center bore of the outer piston member.

14. The apparatus of claim 13, wherein:

the second piston rod engages the outer piston member and the inner piston member, the second piston rod has a center bore extending axially through the second piston rod, and a third piston rod extends through the center bore of the second piston rod and engages the inner piston member.

* * * * *